United States Patent [19]
Lamm et al.

[11] 3,821,082
[45] June 28, 1974

[54] TREATING CELLS OF MICROORGANISMS CONTAINING INTRACELLULAR GLUCOSE ISOMERASE

[75] Inventors: William R. Lamm; Larry G. Davis; Robert G. Dworschack, all of Clinton, Iowa

[73] Assignee: Standard Brands Incorporated, New York, N.Y.

[22] Filed: Apr. 7, 1972

[21] Appl. No.: 242,142

[52] U.S. Cl. .................. 195/31 F, 195/65, 195/102
[51] Int. Cl. ............................................. C12b 1/00
[58] Field of Search ............................. 195/31, 65

[56] References Cited
OTHER PUBLICATIONS

Yoshimura et al., Agr. Biol. Chem., Vol. 30, No. 10, p. 1,015–1,023, (1966).

Hough et al., Nature, Vol. 235, p. 389, (1972).

*Primary Examiner*—A. Louis Monacell
*Assistant Examiner*—Thomas George Wiseman

[57] ABSTRACT

Cells of microorganisms containing intracellular glucose isomerase are treated with a sufficient amount of a salt-containing solution under conditions whereby the glucose isomerase is fixed or stabilized within or on the cells and the cells are contacted with a glucose containing solution to convert a portion of the glucose to fructose.

9 Claims, No Drawings

TREATING CELLS OF MICROORGANISMS CONTAINING INTRACELLULAR GLUCOSE ISOMERASE

THE INVENTION

This invention relates to a method of treating cells of microorganisms containing intracellular glucose isomerase to fix or stabilize the glucose isomerase within or on the cells. This invention also relates to a process for enzymatically isomerizing glucose in a glucose-containing solution whereby the glucose-containing solution is contacted with cells of microorganisms containing intracellular glucose isomerase which have been treated to fix or stabilize the glucose isomerase within or on the cells thereby converting a portion of the glucose in the glucose-containing solution to fructose.

There are many processes known in the art for producing fructose-containing solutions. Broadly, these may be grouped into three categories. In the first category, sucrose is inverted to glucose and fructose by the use of an acid, an acidic material or an enzyme such as invertase.

In the second category, glucose is converted to fructose by the use of alkaline catalysts. There are many papers and patents which disclose various alkaline catalysts and the use thereof for converting glucose to fructose. Exemplary of processes using alkaline catalysts are those disclosed, for instance, in U.S. Pat. No. 2,487,121 to Fetzer et al.; U.S. Pat. No. 2,746,889 to Langlois et al.; Canadian Pat. No. 488,178 to Cantor et al.; U.S. Pat. No. 3,285,776 to Scallet et al.; U.S. Pat. No. 3,383,245 to Scallet et al.; and U.S. Pat. No. 3,305,395 to Scallet et al.

Although a great deal of interest has been shown in alkaline isomerization of glucose to fructose and there has been a relatively large amount of experimentation in this area, so far as we know, alkaline isomerization has never been practiced commercially. This is believed to be due to the nonselectivity of alkaline catalysts which results in various objectionable by-products being formed, such as large amounts of colored bodies and acidic materials. To refine alkaline-isomerized liquors to remove objectionable by-products so as to produce an acceptable product requires rather complicated and costly procedures.

The third category for producing fructose-containing syrups involves enzymatically converting glucose in a glucose-containing solution, e.g., corn syrup, to fructose. Various microorganisms are known in the art which produce glucose isomerase. For example, in an article appearing in *Science*, Vol. 125, pp. 648–9 (1957), it is disclosed that an enzyme derived from *Pseudomonas hydrophila* will isomerize glucose to fructose. Also, British Pat. No. 1,103,394 and Japanese Pat. No. 17,640 (1966) disclose that microorganisms classified as belonging to the Streptomyces genus, such as *Streptomyces flavovirens*, *Streptomyces achromogenes*, *Streptomyces echinatus*, *Streptomyces albus*, and *Streptomyces phaeochromogenes* produce glucose isomerase. There are many other microorganisms which are disclosed in the art as producing glucose isomerase. Among these other microorganisms disclosed are *Aerobacter cloacae*, *Bacillus megaterium*, *Acetobacter suboxydans*, *Acetobacter melanogenus*, *Acetobacter roseus*, *Acetobacter oxydans*, *Bacillus fructosus* and *Lactobacillus fermenti*.

Generally, glucose isomerase is primarily produced intracellularly by the above microorganisms. However, it is likely that certain microorganisms produce varying proportions of extracellular and intracellular glucose isomerase. Another factor which may effect the production of intracellular glucose isomerase are the conditions under which the growth or propagation of the microorganism is performed. Conditions could be used which would favor the production of extracellular glucose isomerase over the production of intracellular glucose isomerase.

Normally, when cells of microorganisms containing intracellular glucose isomerase are used to isomerize glucose to fructose, the isomerase is released or is extracted from the cells. When the isomerase is released or extracted it is essentially solubilized. It would involve rather costly and complicated procedures to recover the solubilized isomerase so that it could be used in another isomerization reaction.

In an article entitled "*Streptomyces Glucose Isomerase*" by Takasaki et al. which appeared in *Fermentation Advances* (1969) pp. 561–589, there is disclosed a method whereby cells of microorganisms containing intracellular glucose isomerase are heated to stabilize or fix the glucose isomerase within or on the cells. We have discovered an alternate method of fixing or stabilizing intracellular glucose isomerase. This method comprises treating cells of microorganisms containing intracellular glucose isomerase with a salt solution. The treatment may be effected by a variety of methods. For example, an aqueous suspension of the cells may be formed and a salt added to the suspension or the cells may be relatively dry and an aqueous solution of a salt added thereto.

The conditions under which the cells of the microorganisms containing intracellular glucose isomerase are treated with the salt solution to reduce the extractability of the glucose isomerase can vary significantly. Of course, conditions should not be selected which would substantially inactivate the glucose isomerase. The concentration of the salt in the solution, the pH of the treatment medium, the temperature at which the treatment is effected and the particular salt used are interdependent variables and changing any one of the same can substantially alter the efficacy of the treatment. It is preferred that the treatment be performed so that less than about 50 per cent of the intracellular glucose isomerase is inactivated and the extractability coefficient (hereinafter defined) of the cells is less than about 35 per cent. Most preferably, the treatment is performed so that less than about 15 per cent of the intracellular glucose isomerase is inactivated and the extractability coefficient of the cells is less than about 15 per cent.

The preferred salts for treatment of cells of microorganisms which contain intracellular glucose isomerase are barium chloride, ferric chloride, cobaltous chloride, sodium chloride, chromic nitrate, cupric chloride and mixtures thereof. The most preferred salt is cobaltous chloride. In the case of cobaltous chloride, concentrations in the range of from about 0.005 to about 0.1 molar provide satisfactory results.

The pH at which the treatment is effected may vary significantly, for instance, in the range of from about 6 to about 9. Substantially neutral pH is preferred since there occurs no substantial inactivation of the glucose isomerase at such pH.

The temperature at which the treatment is effected also may vary significantly. Generally, however, temperatures in the range of from about 20° to about 85° C. provide satisfactory results. Temperatures in the range of from about 20° to about 40° C. are preferred.

The cells of microorganisms containing intracellular glucose isomerase treated according to the present invention are preferably derived from microorganisms of the Streptomyces genus. Particularly preferred microorganisms are Streptomyces sp. 21175 and Streptomyces sp. 21176.

To enzymatically convert glucose in a glucose-containing solution to fructose, the cells of microorganisms containing fixed or stabilized glucose isomerase may be contacted with the solution in any convenient manner. For instance, the treated cells may be placed in a column and the glucose-containing solution passed therethrough or the cells may be used in a batchwise fashion.

The conditions for enzymatic isomerization may vary widely, but it is preferred that the temperature and pH be maintained within the ranges of from about 50° to about 75° C. and about 6 to about 8.5, respectively. At a temperature of about 70° C., about 52.3 per cent of the glucose present in the solution can theoretically be converted to fructose. For each 5° reduction in temperature below 70° C., the maximum amount of fructose attainable is reduced by about 1 per cent. The length of time that the isomerization reaction is carried out is principally dependent upon the amount of fructose desired in the finished product.

The following Examples are descriptive of the nature of the present invention and of the procedures employed. They are intended to serve solely by way of example and not to delineate the scope of the invention or limit the ambit of the appended claims.

Various terms and expressions used in foregoing discussion and in the examples are defined as follows:

FRUCTOSE CONTENT OF ISOMERIZED LIQUOR

Fructose content of the isomerized liquor was determined by measuring the change in specific rotation which occurred during isomerization. Specific rotations were measured using a Bendix Corporation NPL Model 969 Automatic Polarimeter. The rotations were determined at a concentration of 2.5 g/100 ml in a glass cell thermostated at 25° C. Path of the cell was 50 mm. The specific rotations were determined at the beginning of the isomerization reactions after all ingredients in the isomerization reaction mixtures had been combined. To determine change in fructose content, the specific rotation of the isomerized liquor at time t was determined. All samples were adjusted to pH 4.0 with dilute hydrochloric acid in order to halt enzyme action before dilution for determination of rotations. Change in fructose content was calculated by using the following formula:

Per cent fructose = $100 \ (\alpha t - \alpha o)/-138.9$ $\alpha o$ = specific rotation at start of isomerization
$\alpha t$ = specific rotation at time $t$ In the formula the factor −138.9 is the change in specific rotation which occurs when glucose is converted completely to fructose.

INTERNATIONAL GLUCOSE ISOMERASE UNIT

An International Glucose Isomerase Unit (IGIU) is that amount of enzyme which will convert 1 micromole of glucose to fructose per minute in a solution containing 2 moles glucose, 0.02 moles $MgSO_4$, 0.001 moles $CoCl_2$ per liter at a pH of 6.84 to 6.85 (0.2 M sodium maleate) at a temperature of 60° C.

EXTRACTABILITY COEFFICIENT

Cellular material containing fixed or stabilized glucose isomerase is held in an aqueous suspension containing 0.001 moles $Co^{++}$ per liter at a temperature of 58° C. and a pH of 6.3. The cellular material is held under these conditions for 24 hours, a portion of the suspension is sonicated at 20 kilocycles by the use of a Branson S75 Sonifier. The sonicated material is centrifuged and the supernatant analyzed for total glucose isomerase activity. Another portion of the suspension (not sonicated) is filtered and the concentration of the extracted isomerase determined. The concentration of extracted isomerase in the filtrate divided by the total glucose isomerase activity multiplied by 100 is the extractability coefficient of the treated cellular material.

EXAMPLE I

This Example illustrates the ability of various salts at several concentrations to fix or stabilize intracellular glucose isomerase.

Streptomyces sp. ATCC 21175 was cultivated in a suitable medium under aerobic conditions for 50 hours in commercial fermentors. A sample of the fermented broth was taken and divided into 100 ml portions. Salts at various concentrations were added to the portions of the fermented broth, the pH was adjusted to 8.5 with sodium hydroxide solution and the portions were then placed in a constant temperature water bath at 30° C. for 3 hours. The pH of the portions was maintained at 8.5 by intermittent additions of a sodium hydroxide solution. Two per cent filter aid (Dicalite CP-175) was added to each portion and the portions filtered. The filter cakes were assayed to determine their extractability coefficients and the per cent of fixed glucose isomerase activity recovered in the cellular mass. The results ar set forth in Table I below.

TABLE I

CONDITIONS OF TREATMENT

| Type Salt | Concentration of Salt (Molarity) | Extractability Coefficient (percent) | Isomerase Recovered (percent) |
| --- | --- | --- | --- |
| Control (no salt addition) | 0 | 50 | 49 |
| $BaCl_2$ | 0.5 | 5 | 106 |
| | 0.05 | 51 | 47 |
| | 0.005 | 50 | 54 |
| $CaCl_2$ | 0.5 | 0 | 0 |
| | 0.05 | 20 | 56 |
| | 0.005 | 33 | 74 |
| $FeCl_3$ | 0.05 | 0 | 0 |
| | 0.005 | 13 | 74 |

TABLE I—Continued

| Type Salt | CONDITIONS OF TREATMENT Concentration of Salt (Molarity) | Extractability Coefficient (percent) | Isomerase Recovered (percent) |
|---|---|---|---|
| FeCl$_2$ | 0.5 | 0 | 0 |
|  | 0.05 | 0 | 0 |
|  | 0.005 | 23 | 35 |
| MnCl$_2$ | 0.5 | 0 | 0 |
|  | 0.05 | 39 | 26 |
|  | 0.005 | 16 | 58 |
| MgCl$_2$ | 0.5 | 0 | 0 |
|  | 0.05 | 32 | 70 |
|  | 0.005 | 85 | 11 |
| NiCl$_2$ | 0.5 | 0 | 0 |
|  | 0.05 | 3 | 22 |
|  | 0.005 | 53 | 25 |
| ZnCl$_2$ | 0.5 | 0 | 0 |
|  | 0.05 | 2 | 45 |
|  | 0.005 | 12 | 62 |
| CoCl$_2$ | 0.05 | 11 | 89 |
| NaCl | 0.5 | 22 | 84 |
|  | 0.05 | 62 | 38 |
| Cr(NO$_3$)$_3$ | 0.5 | 0 | 0 |
|  | 0.05 | 3 | 74 |
| CuCl$_2$ | 0.1 | 5 | 45 |
|  | 0.01 | 9 | 106 |
|  | 0.001 | 37 | 43 |
| PbCl$_2$ | 0.1 | 0 | 0 |
|  | 0.01 | 65 | 33 |
|  | 0.001 | 73 | 30 |
| AgNO$_3$ | 0.1 | 27 | 71 |
|  | 0.01 | 38 | 78 |
|  | 0.001 | 54 | 50 |
| HgCl$_2$ | 0.1 | 72 | 29 |
|  | 0.01 | 57 | 50 |
|  | 0.001 | 60 | 42 |

From the above table it is apparent that all the salts tested, except HgCl$_2$, had a beneficial effect on the extractability coefficient of the cells of the microorganism. The concentration of the salt is important since at certain concentrations there was little or no effect on the extractability coefficient. Also, it is seen that although certain salts had a beneficial effect on the extractability coefficient, they substantially inactivated the glucose isomerase.

EXAMPLE II

This Example illustrates the effect of various concentrations of CoCl$_2$·6H$_2$O on fixing or stabilizing intracellular glucose isomerase.

A fermented broth was prepared in the manner described in Example I. A sample of the broth was divided into 5 equal portions and various amounts of cobalt chloride salt were dissolved in four of the portions. The fifth portion was not treated and served as a control. The pH of each portion was adjusted to 8.5 with a NaOH solution. The temperature was adjusted to 30° C. and held for 4 hours and the pH maintained at 8.5 by intermittent additions of sodium hydroxide. The portions were filtered on a Buchner funnel and the filter cakes assayed to determine their extractability coefficients and the per cent of glucose isomerase activity recovered in the cellular mass. The results are set forth in Table II below.

TABLE II

| CONDITIONS OF TREATMENT | | |
|---|---|---|
| CoCl$_2$·6H$_2$O Concentration (Molarity) | Extractability Coefficient (percent) | Isomerase Recovered (percent) |
| Control (no salt addition) | 94 | 81 |
| 0.005 | 62 | 96 |
| 0.01 | 33 | 97 |
| 0.05 | 3 | 91 |
| 0.10 | 0 | 81 |

From the above table it is seen that as the concentration of CoCl$_2$·6H$_2$O was increased, the extractability coefficient of the treated cells decreased.

EXAMPLE III

This Example illustrates the effect of pH on stabilizing or fixing intracellular glucose isomerase.

A sample of fermented broth was prepared in the manner described in Example I. A sufficient amount of CoCl$_2$·6H$_2$O was added to the broth to obtain therein a CoCl$_2$·6H$_2$O concentration of 0.05 M. The sample was divided into seven equal portions. The pH of these portions was adjusted to various levels by the addition of a solution of NaOH. The portions were then held for 4 hours at 30° C. The portions were filtered on a Buchner funnel and the filter cakes assayed to determine their extractability coefficients and the per cent of fixed glucose isomerase activity recovered in the cellular mass. The results are set forth in Table III below.

TABLE III

| CONDITIONS OF TREATMENT | | |
|---|---|---|
| pH | Extractability Coefficient (percent) | Isomerase Recovered (percent) |
| 6.0 | 67 | 97 |
| 6.5 | 64 | 78 |
| 7.0 | 59 | 73 |
| 7.5 | 10 | 80 |
| 8.0 | 13 | 82 |
| 8.5 | 15 | 98 |
| 9.0 | 8 | 91 |

Example IV

This Example illustrates the effect of various concentrations of NaCl on stabilizing or fixing intracellular glucose isomerase.

A fermented broth was prepared in the manner described in Example I. The pH of a sample of the broth was adjusted to 8.5 with a solution of NaOH and the sample was divided into five equal portions. Various amounts of sodium chloride were added to four of the portions. The fifth portion served as a control. The portions were held for 4 hours at 30° C. and then filtered on a Buchner funnel. The filter cakes were assayed to determine their extractability coefficients and the per cent of glucose isomerase activity recovered. The results are set forth in Table IV below.

TABLE IV

| CONDITIONS OF TREATMENT | | |
|---|---|---|
| NaCl Concentration (Molarity) | Extractability Coefficient (percent) | Isomerase Recovered (percent) |
| Control (no salt addition) | 54 | 82 |
| 0.01 | 56 | 79 |
| 0.05 | 44 | 74 |
| 0.1 | 44 | 80 |
| 0.25 | 20 | 84 |

From the above table it is seen that as the concentration of the salt increases there is a decrease in the extractability coefficient.

The terms and expressions which have been employed are used as terms of description and not of limitation, and it is not intended in the use of such terms and expressions to exclude any equivalents of the features shown and described.

What is claimed is:

1. In a method of enzymatically converting glucose to fructose wherein microorganisms of the Streptomyces genus are propagated to produce cells containing intracellular glucose isomerase and said cells are contacted with a glucose-containing solution to convert a portion of the glucose to fructose, the improvement comprising contacting the propagated cells prior to their being contacted with the glucose-containing solution with a sufficient amount of a inorganic salt-containing solution under conditions whereby the glucose isomerase is fixed or stabilized within or on the cells.

2. A method of enzymatically converting glucose to fructose as defined in claim 1, wherein the microorganisms of the Streptomyces genus are Streptomyces sp. 21175 or Streptomyces sp. 21176.

3. A method of enzymatically converting glucose to fructose as defined in claim 1, wherein the cells are contacted with a sufficient amount of a salt-containing solution under conditions whereby less than about 50 percent of the intracellular glucose isomerase is inactivated and the extractability coefficient of the cells is less than about 35 percent.

4. A method of enzymatically converting glucose to fructose as defined in claim 3, wherein the cells are contacted with a sufficient amount of a salt-containing solution under conditions whereby less than about 15 percent of the intracellular glucose isomerase is inactivated and the extractability coefficient of the cells is less than about 15 percent.

5. A method of enzymatically converting glucose to fructose as defined in claim 3, wherein the salt is selected from the group consisting of barium chloride, ferric chloride, cobaltous chloride, sodium chloride, chromic nitrate and mixtures thereof.

6. A method of enzymatically converting glucose to fructose as defined in claim 5, wherein the treatment is performed at a pH in the range of from about 6 to about 9.

7. A method of enzymatically converting glucose to fructose as defined in claim 5, wherein the salt is cobaltous chloride and the solution containing said salt is from about 0.005 to about 0.1 molar therein.

8. A method of enzymatically converting glucose to fructose as defined in claim 6, wherein the treatment is performed at a temperature in the range of from about 20° to about 85° C.

9. A method of enzymatically converting glucose to fructose as defined in claim 8, wherein the treatment is performed at a temperature in the range of from about 20° to 40° C.

* * * * *

UNITED STATES PATENT OFFICE
CERTIFICATE OF CORRECTION

Patent No. 3,821,082          Dated June 28, 1974

Inventor(s) William R. Lamm, Larry G. Davis and Robert G. Dworschack

It is certified that error appears in the above-identified patent and that said Letters Patent are hereby corrected as shown below:

Column 3, lines 10 and 11; after "sp." insert --ATCC--.

Column 4, line 55; last word should read "are".

Column 6, line 54; after "Isomerase" delete colon; line 55, after "percent" close parentheses.

Column 8, lines 4 and 5; after "sp." insert --ATCC--.

Signed and sealed this 24th day of December 1974.

(SEAL)
Attest:

McCOY M. GIBSON JR.　　　　　　　C. MARSHALL DANN
Attesting Officer　　　　　　　　Commissioner of Patents